(12) United States Patent
Roy

(10) Patent No.: US 6,267,080 B1
(45) Date of Patent: Jul. 31, 2001

(54) OUTDOOR RECREATION ENCLOSURE FOR PETS

(76) Inventor: Gerald L. Roy, P.O. Box 1908, Portland, ME (US) 04104-9816

( * ) Notice: Subject to any disclaimer, the term of this patent is extended or adjusted under 35 U.S.C. 154(b) by 0 days.

(21) Appl. No.: 09/316,519

(22) Filed: May 21, 1999

(51) Int. Cl.[7] .................................................. A01K 31/00
(52) U.S. Cl. ............................................................ 119/453
(58) Field of Search .................................. 119/482, 496, 119/453, 472, 452, 479, 480, 483, 161; 296/24.2; 280/47.18, 47.24, 47.26, 47.34, 47.35, 79.2

(56) References Cited

U.S. PATENT DOCUMENTS

| | | | | |
|---|---|---|---|---|
| 2,821,165 | * | 1/1958 | Wright | 119/500 |
| 3,077,181 | | 2/1963 | Marquette . | |
| 3,310,317 | * | 3/1967 | Luff | 280/652 |
| 3,815,549 | * | 6/1974 | Opmeer | 119/459 |
| 3,834,352 | * | 9/1974 | Gervis | 119/453 |
| 4,335,897 | * | 6/1982 | Muller, Jr | 280/47.18 |
| 4,349,210 | * | 9/1982 | Rutt | 280/47.21 |
| 5,113,793 | | 5/1992 | Laeder et al. . | |
| 5,154,137 | * | 10/1992 | Stanaland | 119/496 |
| 5,458,356 | * | 10/1995 | Fedorko et al. | 280/418.1 |
| 6,032,614 | * | 3/2000 | Tominaga | 119/452 |

\* cited by examiner

*Primary Examiner*—Thomas Price
(74) *Attorney, Agent, or Firm*—Thomas L. Bohan; Patricia M. Mathers

(57) ABSTRACT

An enclosure for pets mounted on a single axle with two large wheels and a handlebar, and attached to side frames that provide support in the stationary position. The enclosure is large enough to install lounging platforms and climbing devices for the pets and has an upper area and a lower area. The pet owner has access to the enclosed upper area and enclosed lower area through an uppper access door and a lower access door. The pet is placed in the enclosure through the upper access door and can have access to the lower area through an opening in the floor between the upper area and the lower area. This opening can be closed off by sliding a tray across the floor of the upper area. The enclosure can easily be wheeled to a desired location by lifting slightly on the handlebar and pushing the enclosure to the desired location. The enclosure is made of an open-mesh type material, such as a wire mesh. The lower area can be constructed with solid panels.

15 Claims, 3 Drawing Sheets

OUTDOOR RECREATION ENCLOSURE FOR PETS

BACKGROUND OF THE INVENTION

1. Field of the Invention

The present invention relates to the field of pets. More particularly, the present invention relates to the care of pets out of doors. Most particularly, the present invention relates to an outdoor recreation containment cage for pets.

2. Description of Prior Art

Housepets, for safety reasons, are often not allowed to be outside without human supervision and control. It is difficult to train some pets, particularly cats, to stay within the bounds of a yard and owners of such pets are particularly fearful of a pet roaming into a roadway and being run over by a motor vehicle. Thus, cats are often simply not allowed to go outside at all. Many owners of cats that are kept strictly indoors would like to have some means of allowing the cats to enjoy the outdoors, yet still keep them safe. Such a means should allow the cat owner to easily transport the cat in a secured device to an outdoors location and provide a comfortable yet secure space within which the cat can play and lounge. This means should also provide a separate space for a litter box. Prior art discloses very few containment devices that are suitable for transporting one or more pets to an outdoor location and keeping them in secured surroundings that are at the same time pleasant and appealing to the pet or pets.

Marquette (U.S. Pat. No. 3,077,181; issued 1963) discloses a portable rabbit hutch. The hutch is a cage supported on four legs with two small wheels swingably attached to the two legs at one end. These small wheels can be swung down into an operable position and the cage lifted at the other end and rolled to another spot on the grass to allow the rabbit to graze on fresh grass and to avoid an accumulation of droppings in one spot. The four legs are releasably attached to the hutch and can be slid up along the side of the hutch or released and used to support the hutch at a level above the ground. For general use, the hutch is placed directly on a grassy surface, so as to allow the rabbit to graze on the grass that juts up through the cage-bottom and to deposit its droppings through the cage-bottom onto the grass. Leader et al. (U.S. Pat. No. 5,113,793; issued 1992) discloses a mobile pet carrier for transporting pets, particularly dogs, through shopping malls and tourist attractions. The mobile carrier is similar to a baby stroller with a box-shaped cage set within the frame of the stroller to contain the pet. The cage is covered with material that can be folded back to allow sunlight into the cage. The purpose of the device disclosed by Leader et al. is to allow a person to take his or her pet almost anywhere. Neither of the devices disclosed provides the space, particularly the vertical space, needed to fit the cage with climbing devices such as poles and platforms and other playthings that some animals, particularly cats, typically enjoy for climbing and lounging. Furthermore, neither of the devices provides for a space separate from the playing/lounging space to contain a litter box that is readily accessible by the cats from within the cage and by the pet owner from outside the cage for cleaning and replacement.

Therefore, what is needed is an outdoor recreation containment device for cats that is easily transportable. What is yet further needed is such a device that is spacious enough to allow climbing poles and platforms to be installed. What is still yet further needed is such a device that has a separate space for a litter box that is readily accessible from within the cage by the cat and from outside by the pet owner.

SUMMARY OF THE INVENTION

It is an object of the present invention to provide an outdoor recreation device for pets that provides a secured recreational space for a pet and is easy to transport with the pet in it. It is a further object of the present invention to provide such a device that is spacious and large enough to install climbing poles and platforms for pets to play and lounge on. It is a still further object of the invention to provide a space separate from a recreation space for a litter box that is accessible from within the recreation device by the pets and from the outside of the device by the pet owner for cleaning.

The device of the present invention is an outdoor recreation cart for pets, particularly for cats. This outdoor recreation cart has an animal enclosure mounted on a cart frame with a handlebar and large wheels. The enclosure is divided into two areas—an upper area separated by a floor from a lower area. The upper area has a door through which to place the pet inside the enclosure and is spacious enough to allow climbing poles and platforms to be installed. Other playthings may also be kept in this area, as well as containers for food and water. The lower area can be used to hold a litter box and may also provide storage space for supplies. It is accessible through a lower door by the pet owner, who can withdraw the litter box for cleaning, and by the pet through an opening in the floor between the upper area and the lower area. A tray or board that slides through a narrow opening in an end wall of the upper area and can be easily removed from the upper area for cleaning can be used to cover the floor. The tray has an opening in it so that when the tray covers the floor of the upper area in its normal position, the opening in the tray is located above the opening in the floor, allowing the pet unrestricted access to the lower area. If for some reason access by the pet to the lower area is to be restricted, the tray can be inserted into the upper area "backwards", so that the opening in the floor is now covered by the tray, and the opening in the tray is located above a closed section of the floor. The use of the tray is suggested for reasons of hygiene—it can be cleaned easily once it is removed from the upper area—but is not necessary and is not meant to be limiting. If the floor of the upper area is made of a material that will allow the pet to walk on it easily, the tray can be dispensed with.

The outdoor recreation enclosure is mounted on a cart frame having a single axle, two large wheels, and a side frame on each side of the enclosure connected by a handlebar. The side frames are attached to the recreation enclosure and hold the enclosure in a stable, level condition. The handlebar can be folded down flat against the side of the enclosure in a storage position and moved to an operational position. When the recreation enclosure is to be moved, a slight lift on the handlebar will raise the side frames off the ground, allowing the enclosure to be easily pushed along on its wheels.

The outdoor recreation cart of the present invention has a large spacious enclosure with an upper area and a lower area. The upper area and the lower area are accessible by the pet owner through an upper door and a lower door, respectively. A floor with a pet-accessible opening in it separates the upper recreational area from the lower area. The enclosure is supported on a cart frame and a single axle with wheels. The side frames are lifted off the ground by lifting on the handlebar, thereby allowing the cart to be easily pushed along on its wheels.

DETAILED DESCRIPTION OF THE PREFERRED EMBODIMENT

Figure 1:
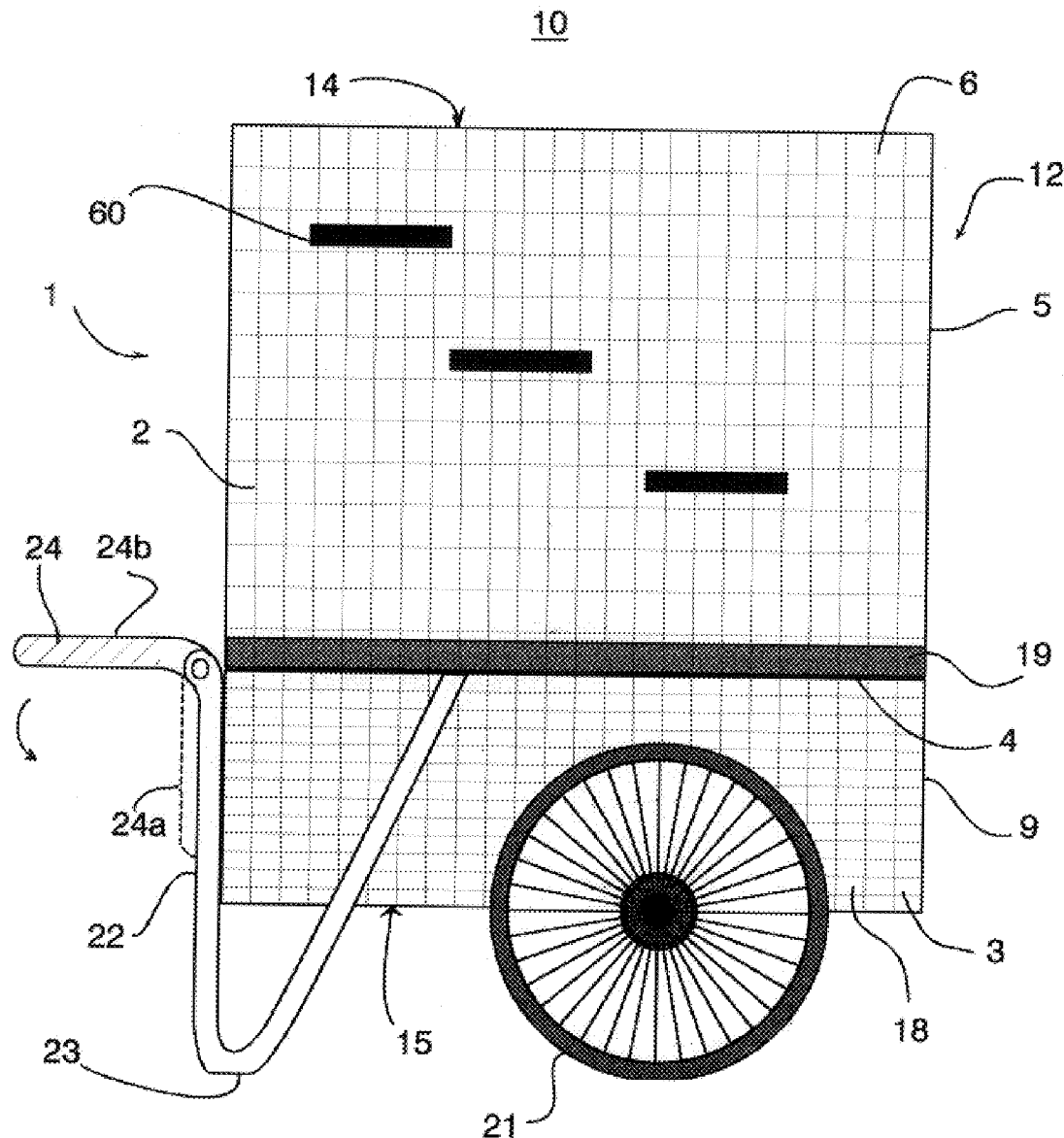
FIG. 1 is a side view of the outdoor recreation enclosure.
Figure 2:
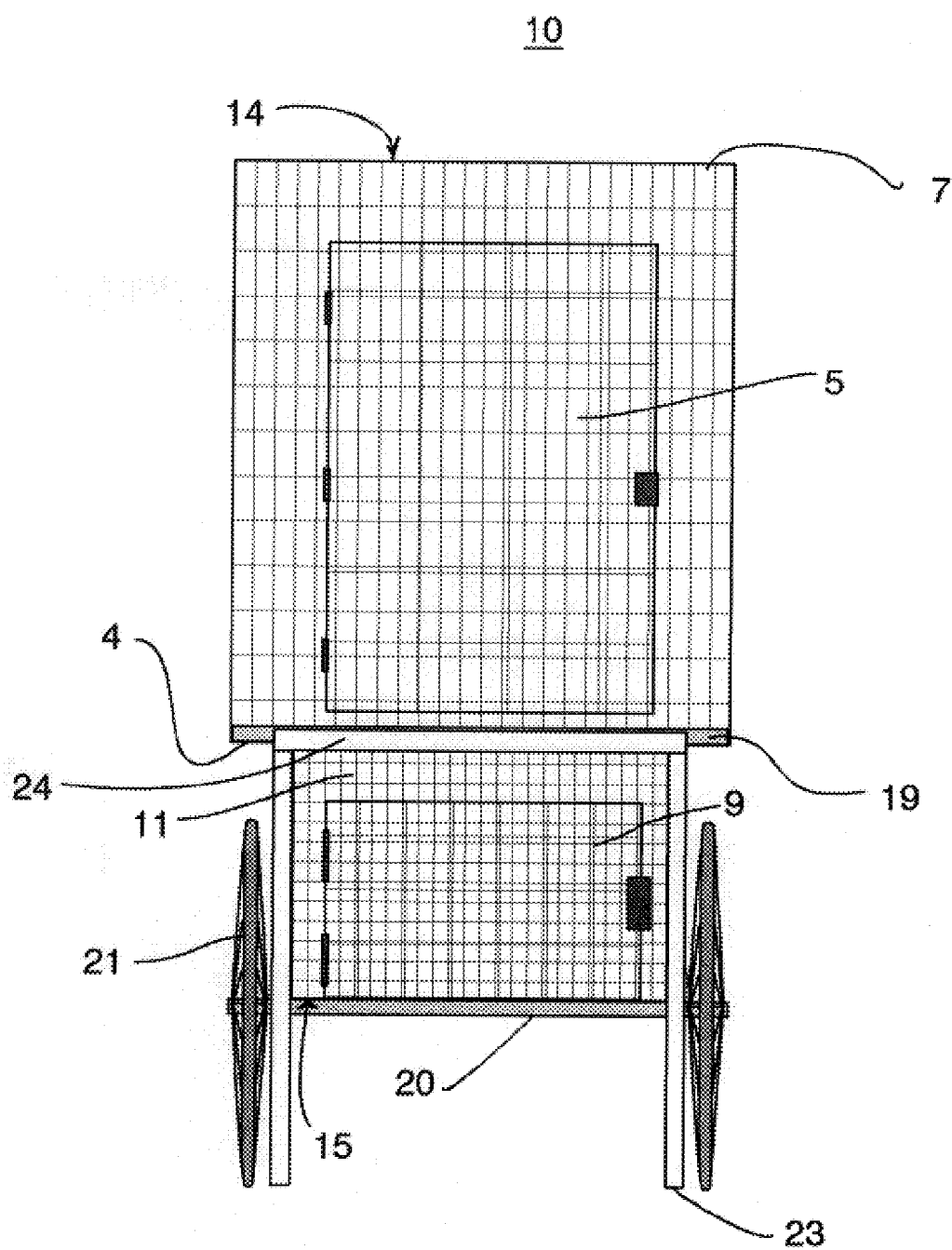
FIG. 2 is an end view of the outdoor recreation enclosure.

The device of the present invention is an outdoor recreation cart 10, as shown in FIG. 1. In the Preferred Embodiment, the recreation cart 10 is used to allow cats to enjoy the out-of-doors in a secured space. An enclosure 1 has an upper area 2 and a lower area 3. As can be seen in FIG. 2, the upper area 2 is wider than the lower area 3. In the Preferred Embodiment, the upper area 2 has two upper side-walls 6 and two lower side-walls 18, two upper end-walls 7 and two lower end-walls 11, and is enclosed by a top 14 and a bottom 15. The upper area 2 is separated from the lower area by a floor 4. The enclosure 1 is generously sized to provide enough space to install platforms 60 for pets to lounge on, as shown in FIG. 1. In the Preferred Embodiment, enclosure 1 is approximately 54 inches long and has an overall height of approximately 60 inches, of which the upper area 2 accounts for approximately 42 inches and the lower area 3 approximately 18 inches. Thus, the upper side-walls 6 are approximately 54"×42"; the lower side-walls 18 approximately 54"×18"; the upper end-walls 7 approximately 36"×42"; and the lower end-walls 11 approximately 25"×18". The floor 4 and the top 14 are approximately 54"×36" and the bottom 15 is approximately 25"× 54". The wheels 21 are approximately 26" in diameter and the axle is approximately 36" in the Preferred Embodiment. The overall width dimension, including the wheels and the side frames, is approximately 42 inches in the Preferred Embodiment. With these dimensions, the recreation cart 10 is wider than the standard house door and is stored outdoors or in a garage. In an alternative embodiment, the width dimensions of the upper end-walls 7 can be reduced to 29", and the lower end-walls 11 to 18" to allow the recreation cart 10 to pass through a standard house door and be brought into a home. In that alternative embodiment, the handlebars 24, the upper door 5, and the lower door 9 are also reduced in width to fit the narrower dimensions of this alternative embodiment Referring again to FIG. 1 and FIG. 2, it can be seen that the lower area 3 is dimensioned to fit between two wheels 21 and mounted on an axle 20, and that each lower side wall 18 is attached to a side frame 22. The two side frames 22 are connected by a handlebar 24. The handlebar 24 can fold down flush against the enclosure 1 in a storage position 24a or be pulled up to an operational position 24b as shown in FIG. 1. The cart 10 is supported in a level upright condition when the support ends 23 of the side frames 22 are resting on the ground. By lifting slightly on the handlebar 24, the support ends 23 of the side frames 22 are raised off the ground and the cart 10 can easily be pushed to a desired location on its wheels 21. In the Preferred Embodiment, the side frames 22 and the handlebar 24 are made of tubing with a polished chrome surface. Other material, such as aluminum tubing, plastic tubing, or other suitable, lightweight, non-corrosible material can also be used.

Figure 3:
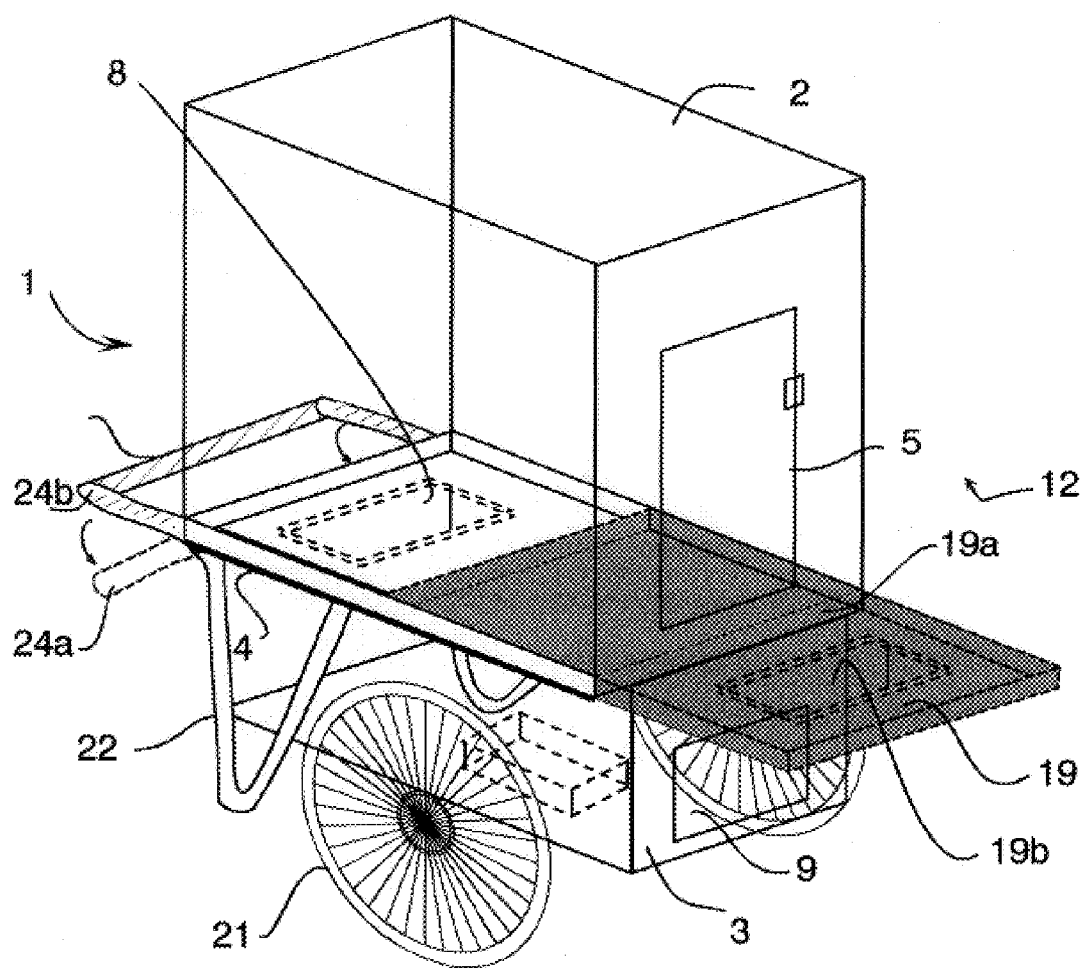
FIG. 3 is a perspective view of the device of the present invention, showing the opening between its upper area and its lower area.

As can be seen in FIG. 3, the floor 4 separating the upper area 2 and the lower area 3 has a floor opening 8 in it to allow the cat to access the lower area 3. This lower area 3 may be used to store a litter box, food, water, and other supplies or to provide an area protected from the elements that the cat may use. In the Preferred Embodiment, a tray 19 is slidably positioned on the floor 4. This tray 19 can easily be removed from the upper area 2 for cleaning by drawing it from the upper area 2 through a slit 19a in the upper end wall 12, as is shown in FIG. 3. In the Preferred Embodiment, the tray 19 is inserted into the upper area 2 so that a tray opening 19b is located above the floor opening 8. Inserted in this manner, the cat has unrestricted access to the lower area 3. An alternative use of the tray 19 is shown in FIG. 3. As can be seen, the tray 19 is being inserted into the upper area 2 so that the tray opening 19b will not coincide with the floor opening 8; the tray 19 will, instead, serve to close off access to the lower area 3 and the tray opening 19b will be located above a closed section of the floor 4. As mentioned above, the purpose of the tray 19 is one of hygiene—it is easy to clean once it has been drawn from the upper area 2. Nevertheless, the use of a tray does not limit the scope of the present invention and it is possible to forego the use of a sliding tray completely. This assumes that the material used for the floor allows the cat to walk on it easily. As shown in FIG. 2, the upper area 2 has an upper area door 5 and a lower area door 9 that are operable from the outside. In the Preferred Embodiment, the upper area door 5 and lower area door 9 are located at an end 12 opposite the handlebar 24 and are made of the same materials as are the upper area 2 and the lower area 3, respectively. The dimensions of the upper area door 5 in the Preferred Embodiment of the recreation cart 10 are approximately 19"×28"; the dimensions of the lower area door 9 are approximately 17"×13".

In the Preferred Embodiment, the enclosure 1 is constructed of an open mesh material with a chrome surface, although other suitable materials having an open structure that will allow air, light, and sound to pass freely through the enclosure 1 can be used. Such materials may include plastic-covered wire mesh material, metal mesh-type material, and plastic materials with an open structure. The wheels 21 are preferably bicycle wheels with rims of having a polished chrome surface and tube tires, although here, too, any material that provides the lightness and strength suitable for the Preferred Embodiment of the recreation cart 10 or the alternative embodiment of the recreation cart can be used. It should be noted that although the entire enclosure 1 is made of an open, mesh-type material in the Preferred Embodiment, the lower area 3 of the enclosure 1 can be constructed of solid material, such as laminated wood panels or solid plastic panels, if so desired. Also, the floor 4 can be constructed of solid material or other material that provides the pet with a comfortable surface for walking on.

While a specific Preferred Embodiment of the present invention has been described herein, including specific dimensions, the scope of the invention encompasses the concept of a recreation cart for pets, and other embodiments of the invention that include variations in dimensions and materials, as well as the shape of the side frames and handlebar, are within the scope of this invention.

I claim:

1. A device for transporting and containing pets for recreation and lounging, said device comprising:

a cart frame having an axle, a large wheel located at each end of said axle, and two side frames connected by a handlebar; and an enclosure having a door, an upper area and a lower area, wherein said upper area is located above said lower area, wherein said upper area is enclosed by two upper side-walls and two upper end-walls, a top, and a floor, said upper area being fixedly attached to said lower area and having a door in one of said upper end-walls, wherein said lower area is enclosed by two lower side-walls, two lower end-walls, and a bottom, said lower area having a utility access door in one of said lower end-walls, wherein said lower area is fixedly attached to said axle between said wheels and to said side frames, wherein said floor of said upper area has an opening so as to allow access by a pet from within said enclosure to said lower area, and wherein said upper area further comprises a tray, said tray being slidably positioned on said floor of said upper area and slidably removable from said upper area by sliding said tray through an opening in a lower end of one of said upper end-walls.

2. The device of claim 1 wherein said upper area has an upper access door.

3. The device of claim 2, wherein said lower area has a lower access door.

4. The device of claim 1 wherein said upper area is made of an open-structure material.

5. The device of claim 4 wherein said open-structure material is wire mesh with a polished chrome coating.

6. The device of claim 4 wherein said open-structure material is plastic-covered wire mesh.

7. The device of claim 4 wherein said lower area is made of the same material as said upper area.

8. The device of claim 1 wherein said wheel is a bicycle wheel.

9. The device of claim 8 wherein said bicycle wheel has a rim with a polished chrome surface.

10. The device of claim 8 wherein said bicycle wheel has a stainless steel rim.

11. The device of claim 1 wherein said side frames and said handlebar are made of rigid, non-corrosible tube material.

12. The device of claim 11 wherein said tube has a polished chrome surface.

13. The device of claim 11 wherein said tube material is aluminum.

14. The device of claim 11 wherein said tube material is plastic.

15. The device of claim 1, wherein said lower area is narrower than said upper area.

* * * * *